United States Patent
Niell et al.

(10) Patent No.: US 11,941,458 B2
(45) Date of Patent: Mar. 26, 2024

(54) MAINTAINING STORAGE NAMESPACE IDENTIFIERS FOR LIVE VIRTUALIZED EXECUTION ENVIRONMENT MIGRATION

(71) Applicant: SK Hynix NAND Product Solutions Corp., Rancho Cordova, CA (US)

(72) Inventors: Jose Niell, Franklin, MA (US); Bradley A. Burres, Waltham, MA (US); Kiel Boyle, Coquitlam (CA); David Noeldner, Fort Collins, CO (US); Keith Shaw, Austin, TX (US); Karl P. Brummel, Chicago, IL (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 838 days.

(21) Appl. No.: 16/814,788

(22) Filed: Mar. 10, 2020

(65) Prior Publication Data

US 2020/0278893 A1    Sep. 3, 2020

(51) Int. Cl.
| | |
|---|---|
| G06F 9/54 | (2006.01) |
| G06F 9/455 | (2018.01) |
| G06F 9/48 | (2006.01) |
| G06F 9/50 | (2006.01) |
| G06F 13/40 | (2006.01) |
| G06F 13/42 | (2006.01) |
| H04L 67/10 | (2022.01) |

(52) U.S. Cl.
CPC .......... *G06F 9/541* (2013.01); *G06F 9/45558* (2013.01); *G06F 9/4856* (2013.01); *G06F 9/5077* (2013.01); *G06F 13/4022* (2013.01); *G06F 13/4282* (2013.01); *H04L 67/10* (2013.01)

(58) Field of Classification Search
CPC ...................................................... G06F 9/541
See application file for complete search history.

(56) References Cited

U.S. PATENT DOCUMENTS 9,183,036 B2 * 11/2015 Bacher ............... G06F 12/1009
9,984,017 B2    5/2018 Nair
(Continued)

OTHER PUBLICATIONS

"Live Migration", Techopedia, https://www.techopedia.com/definition/16813/live-migration, last updated Apr. 13, 2015, 2 pages.

(Continued)

*Primary Examiner* — Andy Ho
(74) *Attorney, Agent, or Firm* — HALEY GUILIANO LLP

(57) ABSTRACT

Examples described herein relate to migrating a virtualized execution environment from a first platform to a second platform while retaining use of namespace identifiers and permitting issuance of storage transactions by the virtualized execution environment. The first platform can include a first central processing unit or a first network interface. The second platform can include a central processing unit that is different that the first central processing unit and a network interface that is the same or different than the first network interface. The second platform can retain access permissions and target media format independent of one or more identifiers associated with the migrated virtualized execution environment at the second platform. Unperformed storage transactions can be migrated to the second platform for execution.

20 Claims, 10 Drawing Sheets

(56) References Cited

U.S. PATENT DOCUMENTS

| | | | |
|---|---|---|---|
| 10,275,361 | B2 | 4/2019 | Ish et al. |
| 10,951,625 | B2 * | 3/2021 | Jadhav ................ G06F 21/6218 |
| 11,061,599 | B2 * | 7/2021 | Gupta ................. G06F 13/1668 |
| 11,204,709 | B2 * | 12/2021 | Ito .......................... G06F 3/0659 |
| 2005/0066160 | A1 | 3/2005 | Parham et al. |
| 2017/0041288 | A1 | 2/2017 | Stotski et al. |
| 2017/0302737 | A1 | 10/2017 | Piyush et al. |
| 2019/0042329 | A1 | 2/2019 | Kakaiya et al. |
| 2019/0146675 | A1 * | 5/2019 | Subramanian ........ G06F 3/0607 711/170 |
| 2019/0215341 | A1 | 7/2019 | Bharadwaj et al. |
| 2019/0317802 | A1 | 10/2019 | Bachmutsky et al. |

OTHER PUBLICATIONS

"Overview of SR-IOV Data Paths", Microsoft, https://docs.microsoft.com/en-us/windows-hardware/drivers/network/overview-of-sr-iov-data-paths, Dec. 14, 2021, 4 pages.

Clark, Christopher, et al., "Live Migration of Virtual Machines", USENIX Association, NSDI '05: 2nd Symposium on Networked Systems Design & Implementation, 14 pages.

Marks, Kevin, "An NVM Express Tutorial", Dell, Inc., Flash Memory Summit 2013, 92 pages.

Siron, Eric, "A step-by-step guide to understand Hyper-V Live Migration", Altaro, https://www.altaro.com/hyper-v/a-step-by-step-guide-hyper-v-live-migration/, Jul. 26, 2016, 8 pages.

Intel, "PCI-SIG SR-IOV Primer An Introduction to SR-IOV Technology", Intel® LAN Access Division, Revision 2.5, Jan. 2011, 28 pages.

Microsoft Ignite, "Overview of SR-IOV Data Paths", Microsoft Docs, https://docs.microsoft.com/en-us/windows-hardware/drivers/network/overview-of-sr-iov-data-paths, Jun. 16, 2021, 3 pages.

NVM Express, "Base Specification", NVM Express Revision 1.3c, Incorporates ECN 001 to ECN 003, ECN 004a, and ECN 005, May 24, 2018, 292 pages.

NVM Express, "NVM Express", NVM Express Revision 1.2b, Incorporates ECNs 001-008, Jun. 1, 2016, 212 pages.

Righini, Marco, "Single-Root Input/Output Virtualization (SR-IOV) with Linux Containers", Networking Documentation, Developer Zone, Published Nov. 10, 2015, 17 pages.

International Search Report and Written Opinion for PCT Patent Application No. PCT/US20/65073, dated Mar. 30, 2021, 11 pages.

Shaya Potter et al., 'WebPod: Persistent Web Browsing Sessions with Pocketable Storage Devices', Conference: Proceedings of the 14th international conference on World Wide Web, WWW 2005, Chiba, Japan, pp. 1-9, May 10-14, 2005 [retrieved on Mar. 12, 2020]. Retrieved from https://www.researchgate.net/publication/221022590_WebPod_persistent_Web_browsing_sessions_with_pocketable_storage_devices, pp. 3, 5, 10 pages.

* cited by examiner

MAINTAINING STORAGE NAMESPACE IDENTIFIERS FOR LIVE VIRTUALIZED EXECUTION ENVIRONMENT MIGRATION

DESCRIPTION

Distributed block storage systems provide block device functionality to applications by presenting logical block devices that are stored in segments scattered across a large pool of remote storage devices. To use these logical block devices, applications need to determine the location of all the segments they need to access. A computing platform can access a storage device using a fabric or network. Example schemes for accessing storage using a fabric or network include Non-volatile Memory Express over Fabrics (NVMe-oF) or other proprietary storage over fabrics or network specifications. NVMe-oF is described at least in NVM Express, Inc., "NVM Express Over Fabrics," Revision 1.0, Jun. 5, 2016, and variations and revisions thereof.

DETAILED DESCRIPTION

The Non-Volatile Memory Express (NVMe) Specification describes a system for accesses to data storage systems through a Peripheral Component Interconnect Express (PCIe) port. NVMe is described for example, in NVM Express™ Base Specification, Revision 1.3c (2018), which is incorporated by reference in its entirety. NVMe allows a host to specify regions of storage as separate namespaces. A namespace can be an addressable domain in a non-volatile memory having a selected number of storage blocks that have been formatted for block access. A namespace can include an addressable portion of a media in a solid state drive (SSD), or a multi-device memory space that spans multiple SSDs or other data storage devices. A namespace ID (NSID) is a unique identifier for an associated namespace. A host device can access a particular non-volatile memory by specifying the namespace, the controller ID and an associated logical address for the block or blocks (e.g., logical block addresses (LBAs)).

In some cases, a smart network interface controllers (SmartNICs) support offload of a storage infrastructure protocol processing stack from host computers. Virtualized execution environments and bare metal instances (e.g., single client running on a server) can run NVMe drivers to handle storage transactions without NVMe SSDs being directly attached to the host (e.g., disaggregated storage) or a hypervisor translating the NVMe protocol into another transport layer protocol. For example, the SmartNIC can use an NVMe-oF offload engine to issue storage transactions to network connected SSDs. A SmartNIC can provide a configuration interface for managing SmartNIC resources and configurations of the NVMe-oF offload engine.

Figure 1A:
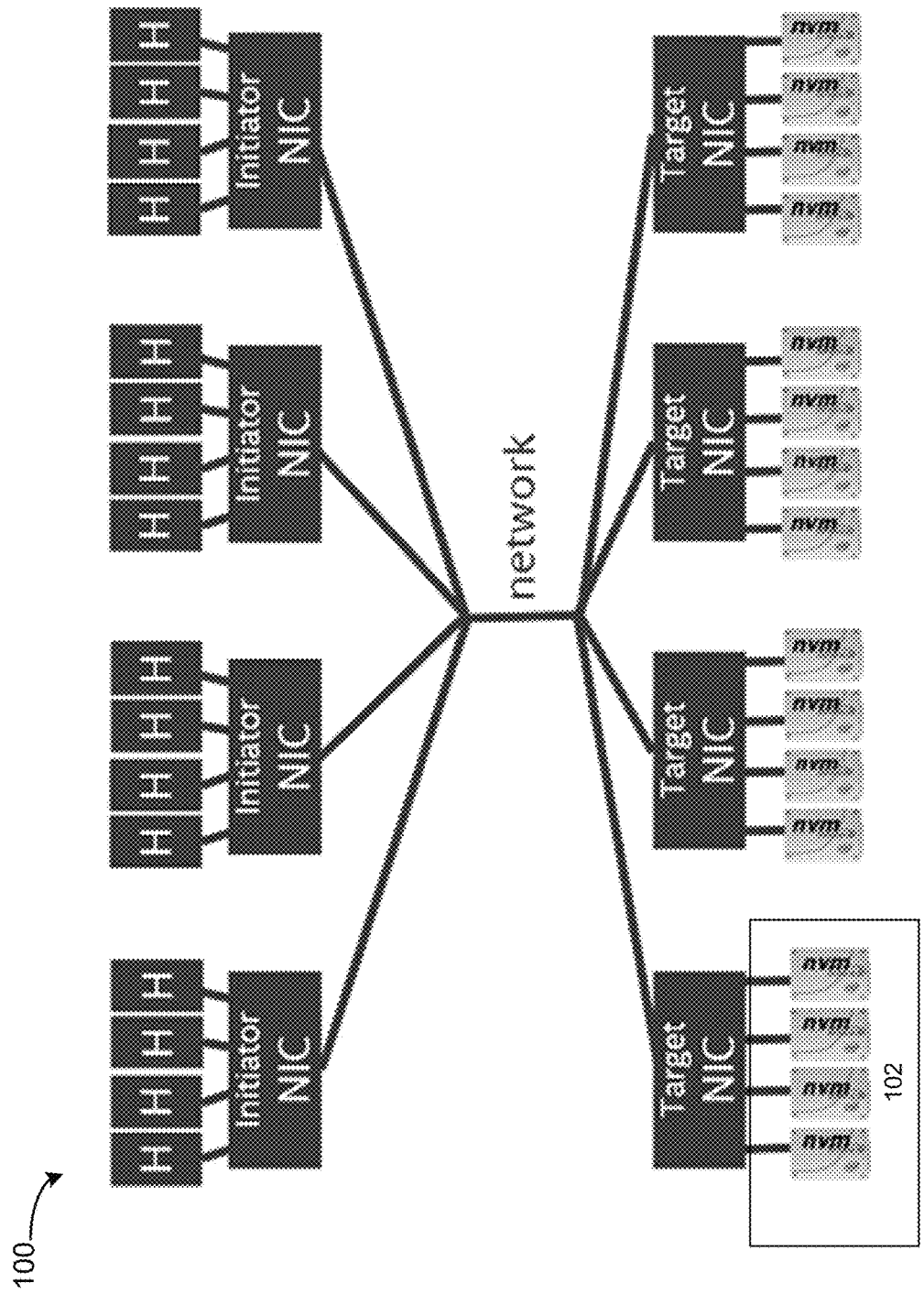
FIGS. 1A and 1B depict high level examples of storage network topologies.
Figure 1B:
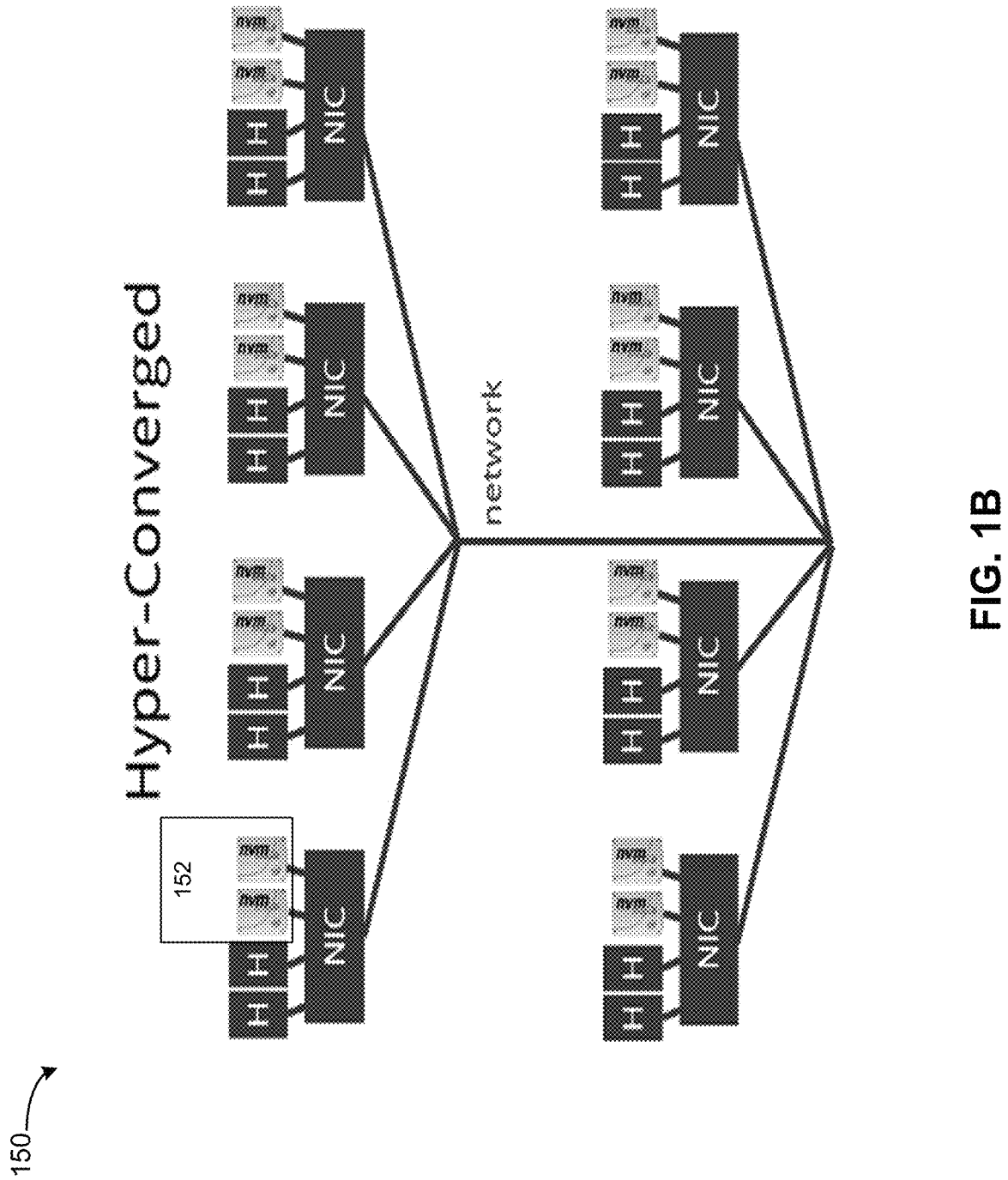

FIGS. 1A and 1B depict high level examples of storage network topologies in which NVMe-oF can be used. In FIG. 1A, a scenario 100 is shown in which various host devices, shown as H, issue storage transactions using initiator NICs over a network to one or more target NICs. A target NIC can have one or multiple NVMe compatible storage devices 102. In FIG. 1B, a scenario 150 is shown in which a hyper-converged topology is shown whereby a host device can access storage 152 that is locally connected to the host or remotely connected to the host device through a network. If a host device requests a storage transaction through the network, the host device's NIC forms a packet that includes the storage transaction and transmits the packet to the target storage device's NIC. Topologies of FIGS. 1A and 1B can be mixed. These are merely illustrative higher level examples that show possible environments in which various embodiments are used.

An NVMe namespace is a quantity of non-volatile memory (NVM) or other type of memory that can be formatted into logical blocks. A namespace can include N logical blocks with logical block addresses from 0 to (N−1). Thin provisioning and deallocation of capacity may be supported, so that capacity of the NVM for a namespace may be less than the size of the namespace. A namespace ID (NSID) is an identifier used at least by a host to identify a namespace for access. In some cases, an NSID can be allocated to a virtual execution environment. For example, a virtual machine VM1 can be allocated NSID1, virtual machine VM2 allocated NSID2, and so forth. When SR-IOV is used, an NSID can be unique to a function (e.g., physical function (PF) or virtual function (VF)). When SIOV is used, a namespace can be unique to a function and a group of queues. NVMe provides access to namespaces through multiple controllers. For a virtual machine (or other isolated domain or virtualized execution environment) that runs an NVMe driver, namespaces appear as standard-block devices on which file systems and applications can be deployed.

In some scenarios, an isolated domain or virtualized execution environment is migrated from a server or computing platform to another computing platform or uses a different network interface, including a composable or composite node. Migration can also involve changing a core or processor on which a virtualized execution environment runs even if in the same CPU node, server, data center, or rack. When an isolated domain or virtualized execution environment is migrated to a different computing platform or uses a different network interface, under some versions of NVMe or other specifications, namespace IDs (NSIDs) are to be preserved.

Various embodiments permit migration of an isolated domain or virtualized execution environment that are allocated use of an NSID from a source platform while preserving requester and target access permissions and exclusions when run on a second platform. For example, a source platform can use a network interface that supports transmission and receipt of storage commands that use mappings of input/output (I/O) commands and responses to shared memory in a host computer and permit parallel I/O data paths to the underlying media with multicore processors to facilitate high throughput and mitigate central processing unit (CPU) bottlenecks. In some examples, the network interface supports NVMe-oF transactions. NVMe-oF transactions with a storage device can use any of a variety of protocols (e.g., remote direct memory access (RDMA), InfiniBand, FibreChannel, TCP/IP, RDMA over Converged Ethernet (RoCE), iWARP, quick UDP Internet Connections (QUIC), and so forth). The source platform can be a computing platform that supports NVMe or NVMe-oF transactions using its host central processing unit and/or an offload of support of NVMe-oF transactions to a network interface. Similarly, the second platform can be a computing platform that supports NVMe or NVMe-oF transactions using its host central processing unit and/or an offload of support of NVMe-oF transactions to a network interface.

Various embodiments allow live migration of an isolated domain or virtualized execution environment running a NVMe driver to a second platform and/or NIC. In a cloud data center, an isolated domain or virtualized execution environment may be migrated from one core to another core or one compute node to another without any functional disruption to the NVMe driver so that it can continue to issue storage transactions to one or more NSIDs. As part of live migration, a different physical function (PF) identifier, virtual function (VF) identifier, or submission queue identifier can be assigned to the migrated isolated domain or virtualized execution on a second platform and/or NIC, but the NSID does not change. Parameters related to determining permissions and exclusions (e.g., requester and target) and format of target media referenced by the NSID for one or more NSIDs are unchanged despite use of the second platform and potential changes to an allocated PF identifier, VF identifier, submission queue identifier, or other parameters at the second platform. Accordingly, by migration of NSID and permissions/exclusions and target media format to the second platform and/or NIC, storage transactions to the storage device with logical blocks corresponding to the NSID can continue without disruption after migration of an isolated domain or virtualized execution environment.

Figure 2:
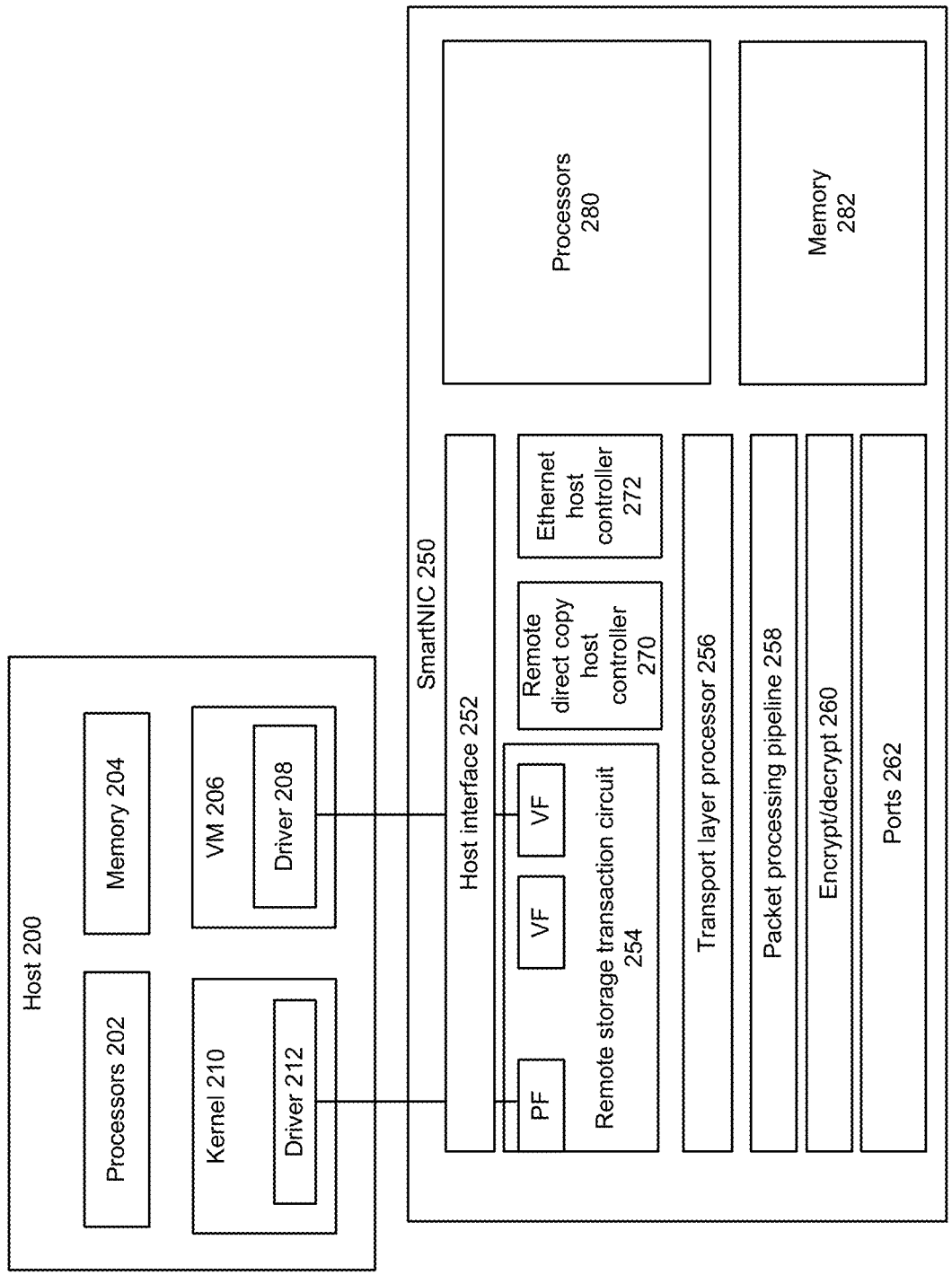
FIG. 2 depicts an example system.

FIG. 2 depicts an example system. Host system 200 can include various processors 202 and memory 204. Processors 202 can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Processors 102 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein.

Processors 202 can execute an operating system and one or more virtualized execution environments (e.g., VM 206). A virtualized execution environment can include at least a virtual machine, process containers, machine containers, or application processes. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include access of memory by a particular container but not another container. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

A single-root I/O virtualization (SR-IOV) extension can be used to enable multiple virtualized execution environments (e.g., system images) to share PCIe hardware resources under a single-node system (e.g., single root complex). SR-IOV is compatible at least with specifications available from Peripheral Component Interconnect Special Interest Group (PCI SIG) including specifications such as Single Root I/O Virtualization and Sharing specification Revision 1.1 (2010) and variations thereof and updates thereto. A SR-IOV device provides a bus device function (BDF) identifier for a virtual function within a PCIe hierarchy; a unique memory address space for a virtual function (VF) within a PCIe hierarchy; a unique error logging and escalation scheme; a unique MSI/MSI-X capability for each VF within a PCIe hierarchy; and power-management capabilities for each VF within a PCIe hierarchy. In addition, SR-IOV provides the capability to discover and configure virtualization capabilities which include a number of VFs that the PCIe device will associate with a device and the type of base address register (BAR) mechanism supported by the VFs.

Scalable I/O Virtualization (SIOV) can be used by the system. SIOV is a PCIe-based virtualization technique that provides for scalable sharing across virtualized execution environments of I/O devices, such as network controllers, storage controllers, graphics processing units, and other hardware accelerators across a large number of virtualized execution environments. Unlike the coarse-grained device partitioning approach of SR-IOV to create multiple VFs on a PF, SIOV enables software to flexibly compose virtual devices utilizing the hardware-assists for device sharing at finer granularity. Performance critical operations on the composed virtual device are mapped directly to the underlying device hardware, while non-critical operations are emulated through device-specific composition software in the host. A technical specification for SIOV is Intel® Scalable I/O Virtualization Technical Specification, revision 1.0, June 2018.

According to some embodiments, network interface drivers 208 and 212 can provide for use of storage commands to remote storage devices. For example, a virtualized execution environment (e.g., VM 206) can issue a storage command and driver 208 can issue storage commands to a remote storage device using NVMe or NVMe-oF by issuing commands to queues in SmartNIC 250. If an operating system kernel 210 or virtualized execution environment (e.g., VM 206) use SIOV or SR-IOV, driver 212 and driver 208 access respective physical function (PF) and particular virtual function (VF). Examples of storage commands include, but are not limited to: read, write, add queue, remove queue, error log, enable controller, or disable controller.

SmartNIC 250 can provide a hardware offload that is higher performance and lower power use than a software solution running on host 200, enabling offload of I/O operations. SmartNIC 250 can greatly scale a number of supported NSIDs and virtual functions. For example, to issue a storage command to the SmartNIC 250, a virtualized execution environment (e.g., VM 206) can write a tail pointer to a doorbell register using interface 252. Interface 252 can be compatible with PCIe in some examples, although other interfaces can be used. In some examples, the virtualized execution environment specifies a table key with a storage command for SmartNIC 250 to identify relevant permissions and target drive format. For example, a table entry can specify {FType[ 1:0], PF[2:0], ID[11:0], NSID[11:0]}. FType can identify a source of a storage transaction (e.g., PF or VF). PF can indicate a physical function number. ID can identify a unique NSID scope for a queue. NSID can represent an NSID for a storage transaction.

SmartNIC 250 can include a remote storage transaction circuit 254 to enable virtualized execution environments to define NSIDs. Remote storage transaction circuit 254 can use a look-up-table (e.g., content addressable memory (CAM) or hash table) to access content from one or multiple linked tables to determine whether a storage command from a requester is permitted or not and whether the storage command is permitted or not to be issued to the target media device. Table(s) can be configured by a control plane software when a virtualized execution environment is installed on host 200 or migrated from another compute node to host 200. In some examples, a scheme described with respect to FIG. 3 can be used to determine whether a storage command is permitted or not and provide a target media format if the storage command is permitted.

Note that in some examples, an interface can refer to one or more of: a network interface controller, network interface card, smart network interface, fabric interface, interface to an interconnect or bus, and so forth.

In some examples, a table key, provided with a storage transaction, can be converted into a pointer to an entry in a first table. The entry in the first table can indicate what permissions if any are afforded the issuer of the storage command and whether the storage command is permitted or declined. If the storage command is permitted, the entry can also refer to an entry in a second table. The entry in the second table can indicate what permissions, if any, are given in the target media and whether the storage command is permitted or declined. If the storage command is permitted to be issued by the requester and permitted to access the media at addresses corresponding to an NSID provided with the table key, the target media format is provided for use and SmartNIC 250 generates and transmits a packet to a destination NIC that is connected to the target storage device.

Transport layer processor 256, packet processing pipeline 258, encrypt/decrypt circuitry 260, and a port 262 can be used to form and transmit a packet with the proper headers with the storage command over a network or other connection (e.g., fabric, interconnect) to the storage device with the media associated with the NSID for the storage command. In some examples, remote direct copy host controller 270 to support RDMA transactions with the remote storage device. Ethernet host controller 272 can be used to manage multiple communications channels involving Ethernet with host 200.

Processors 202 and memory 204 of host 200 or processors 280 and memory 282 of SmartNIC 250 can be used to handle exception paths that are not handled using remote transaction circuit 254 such as when permission is not granted for a storage command or for other exception handling or processing described herein prior to packet transmission.

Figure 3:
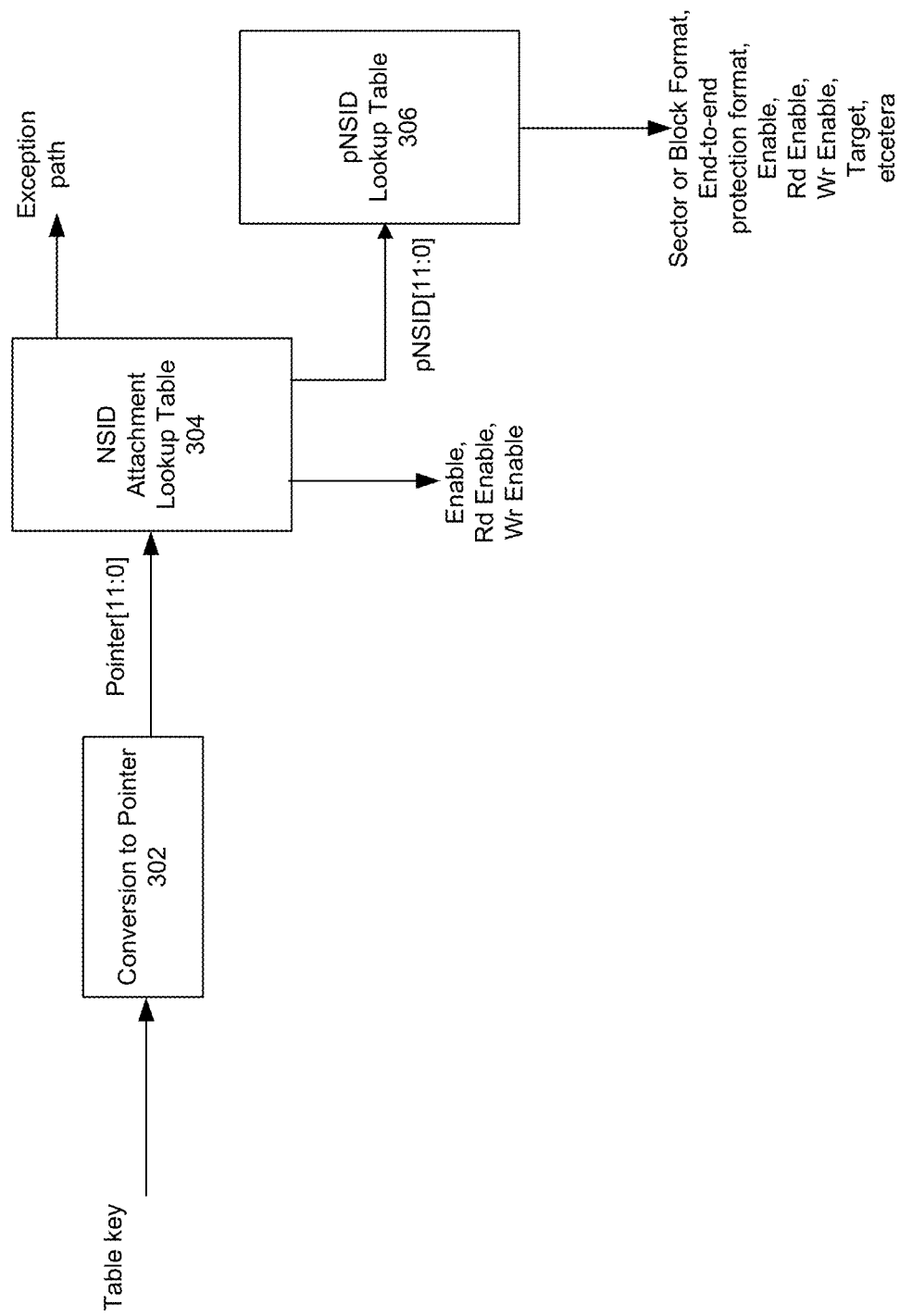
FIG. 3 depicts an example of determination of whether a command to access a particular namespace identifier can proceed.

FIG. 3 depicts an example of determination of whether there is permission for a requester to access a particular address region associated with an NSID. Various embodiments provide a layer of indirection between a virtualized execution environment (which could be migrated) and access permissions (e.g., read or write) and target media access information. Indirection can be provided using look-up operations configured for a particular host platform, NIC or SmartNIC. As described earlier, a source NIC or SmartNIC can use an NSID and format of target drive in connection with an NVMe-oF transaction. Tables 304 and 306 can be configured by control plane software when a new virtual execution environment is assigned to a host.

A table key can have a format of {FType[1:0], PF[2:0], ID[11:0], NSID[11:0]}. The table key can index a much larger table than what is implemented to support multiple NSID scopes. When SR-IOV is used, the table key includes the virtual function and physical function identifier numbers so that a function (virtual or physical) has its own NSID scope. When S-IOV is used, the table key supports using a Submission Queue ID (SQID) to provide a unique NSID scope for a queue. For example, FType can have the following values.

| FType | ID |
| --- | --- |
| 2'b00 (SR-IOV) | VF[10:0] |
| 2'b01 (Reserved for S-IOV) | SQID[11:0] |
| 2'b10 (PF) | 0 |
| 2'b11 (Reserved) | 0 |

Conversion of the table key to a pointer 302 into NISD table 304 can convert a table key to a pointer to a value in table 304. For example, a CAM or hash table can be used to generate the pointer based on the table key value. The pointer can refer to an entry in NISD attachment lookup table 304. In some examples, the pointer is 12 bits, but other sizes can be used.

NISD attachment lookup table 304 can use the pointer to identify permission per source or requester and a primary NSID (pNSID) value assigned to an NSID. NSID attachment lookup table 304 attaches a driver's assigned NSID to an internally assigned pNSID. In some examples, multiple entries in table 304 can be associated with the same pNSID. For example, multiple NSIDs used by different functions may point to the same namespace used as a boot partition. Permission per source can identify properties of a storage drive that are unique to a virtualized execution environment and function queue group. Permission per source can refer to configuration settings for the namespace, such as such as read and write enable (Enable), Read Enable, or Write Enable.

The following provides an example of an output from NSID Attachment Lookup Table 304 in response to a received pointer.

| Output | Notes |
| --- | --- |
| pNSID[11:0] | Primary NSID lookup (e.g., 1-4095) |
| Enable | NVMe commands are allowed to this function's logical NSID |
| RdEN | NVMe read I/O commands are allowed to this function's logical NSID |
| WrEn | NVMe Write I/O commands are allowed to this function's logical NSID |
| Exception path | Transaction involves processing by processor-executed software or offload engine. |

The pNSID can be used as a pointer to Primary Namespace ID (pNSID) Lookup Table 306. pNSID Lookup Table 306 can store configuration information about the logical blocks assigned to a pNSID and indicate permissions per target media device. By contrast, NSID attachment lookup table 304 can indicate permissions for a requester. For a pNSID value, table 306 provides drive format table (e.g., meta data size, sector or block format, end-to-end protection format, encryption enabled/disabled, target (e.g., software queue or hardware offload) and so forth) as well as target permissions (e.g., read and write enabled, read enabled, write enabled). In other embodiments, a single table can be used to indicate requester and target permissions, instead of using two lookups.

In some cases, no match of the pointer derived from table key is found in table 304 and an exception path can be followed for special handling by the host or NIC. In some examples, some pNSID values are associated with special handling or exceptions that can be performed by a Target such as a SmartNIC's processor or the host. For example, exceptions can occur when storage commands for some pNSID values are to be transported using a protocol not supported by the SmartNIC or are to use an encryption, compression, and operations performed using a Target such as host or processor-executed software at the NIC are performed.

For example, if a media is a boot drive and is shared by 9 VMs (with different table keys), all 9 VMs can be assigned the same pNSID and access a same entry in table 306. However, table 304 can indicate whether a particular VM is able to read or write or not to the target media at the addresses associated with the NSID. Table 304 provides PF or VF-specific read and write permissions whereas table 306 has pNSID-level permissions and provides a manner to further restrict access privileges for all PFs or VFs accessing a shared target media beyond the PF or VF-specific settings.

Figure 4:
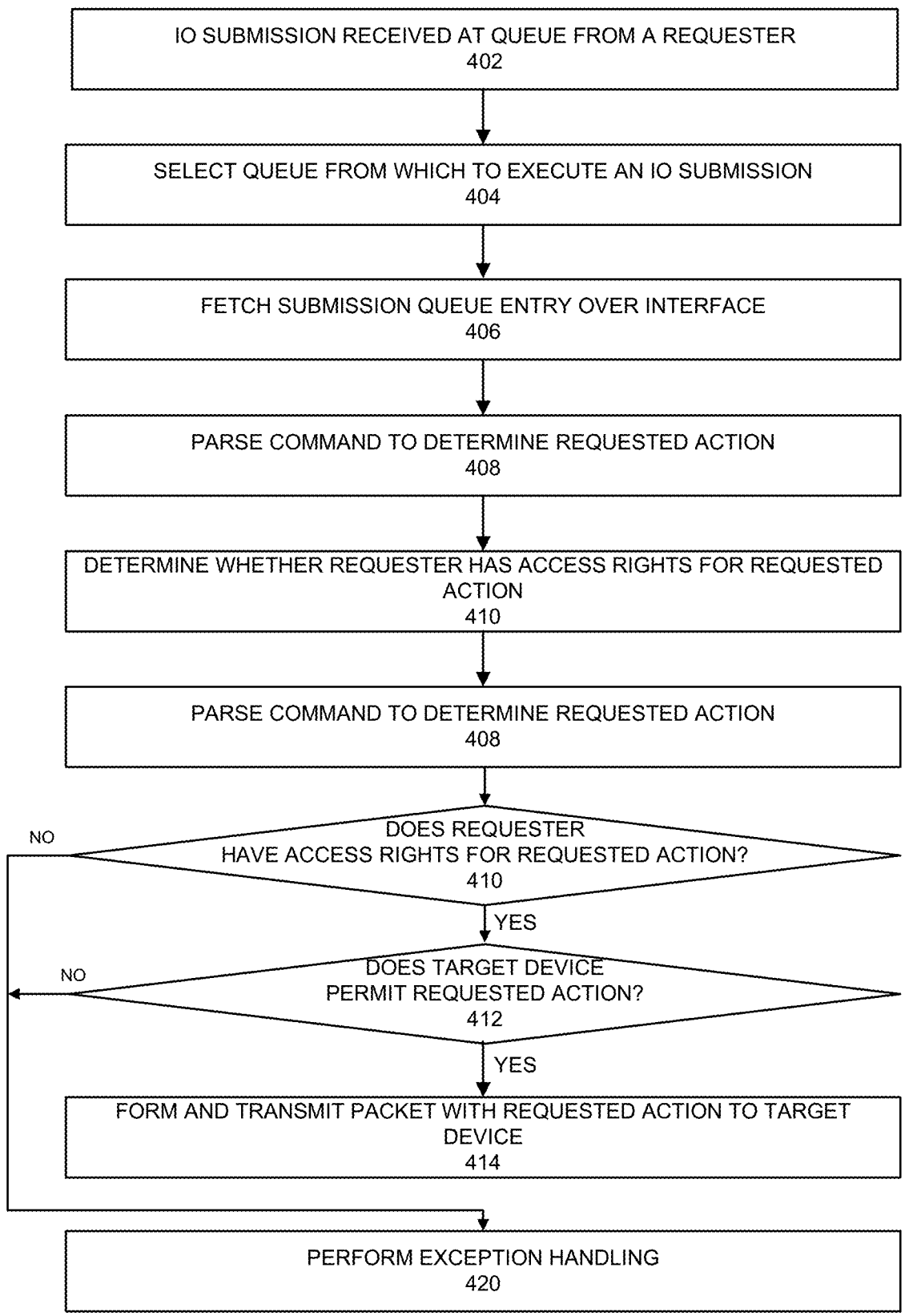
FIG. 4 depicts an example of command execution in connection with storage transaction.

FIG. 4 depicts an example of command execution in connection with a storage transaction. Actions 402 and 404 can be performed by a host system that supports remote storage IO (input output) transactions from a requester. In some examples, the host and its NIC can support SR-IOV or SIOV. At 402, an IO submission is received at a queue from a requester. An IO submission can indicate that a queue was written-to and a doorbell is written-to with a write tail pointer. A requester can be a one or more virtualized execution environment, driver, operating system, or its application.

At 404, a queue is selected from multiple queues from which to execute a next IO transaction. Selection of a queue can be made based on applicable Quality of Service (QoS) whereby certain queues may have priority over other queues or the selection of a transaction from queues is based on a round robin or weighted round robin scheme. A memory resource can be selected to store the command. For example, a memory resource can be SRAM and used to store a storage command. A storage command can be one or more of a read, write, admin, or exception and have an associated NSID.

At 406, the NIC fetches a submission queue entry (SQE) over an interface. For example, the interface can be compatible with PCIe. At 408, the NIC parses the storage command from the memory resource to determine its action. At 410, the NIC looks up the requester's permission rights to determine if the requester is permitted to read-from or write-to the storage region associated with the NSID. A table key can be converted to a pointer to a table that identifies requester permissions. The NIC also provides an identifier for a look-up of permission at the target media device. The process continues to 412. However, a permission violation can occur where the requested operation is not permitted, and the host or NIC handle such exceptions at 420. In some cases, where there is no indication of whether the requester and its command has permission, the host or NIC can handle the situation at 420.

At 412, for a command from a requester that is permitted to be performed, the NIC performs primary namespace lookup for permission at the target media device. A table can be accessed to determine if the permission is granted using an identifier (e.g., pNSID) from a prior table. If there is permission to proceed, the process proceeds to 414. However, a permission violation can occur where the requested operation is not permitted at the target, and the host or NIC handle such exceptions at 420.

At 414, packet formation and transmission are performed. A drive format table (e.g., meta data size, sector or block format, end-to-end protection format, encryption enabled/disabled, and so forth) is provided for use in connection with a packet transmission of the storage command. In some cases, the NIC performs packet formation by copying the payload or content to transmit (e.g., using direct memory access (DMA)) and sending the packet to the destination NIC that can receive storage commands for the target media. In some examples, the NIC can perform encryption of contents of packets prior to transmission. In some cases, the host handles payload fetch and packet formation and instructs the NIC to transmit the packet. Any combination of use of the NIC or host for packet formation and transmission can be used.

At 420, exception handling can be performed. For example, exceptions can occur when storage commands for some combinations of NSID and requesters are to be transported using a protocol not supported by a NIC or are to use an encryption, compression, and operations performed using a specified target host or processor-executed software at the NIC are performed. For example, a table can indicate use of a specific target based on a key or pointer (e.g., pNSID value). In some cases, an exception occurs where a requested action is not permitted and in such case, the host can potentially alert an administrator and check if the requester is malicious. In some cases, a requester and its storage transaction are not identified and in such case, the host and or NIC can issue an error message to an administrator or determine if permission should be granted.

Figure 5:
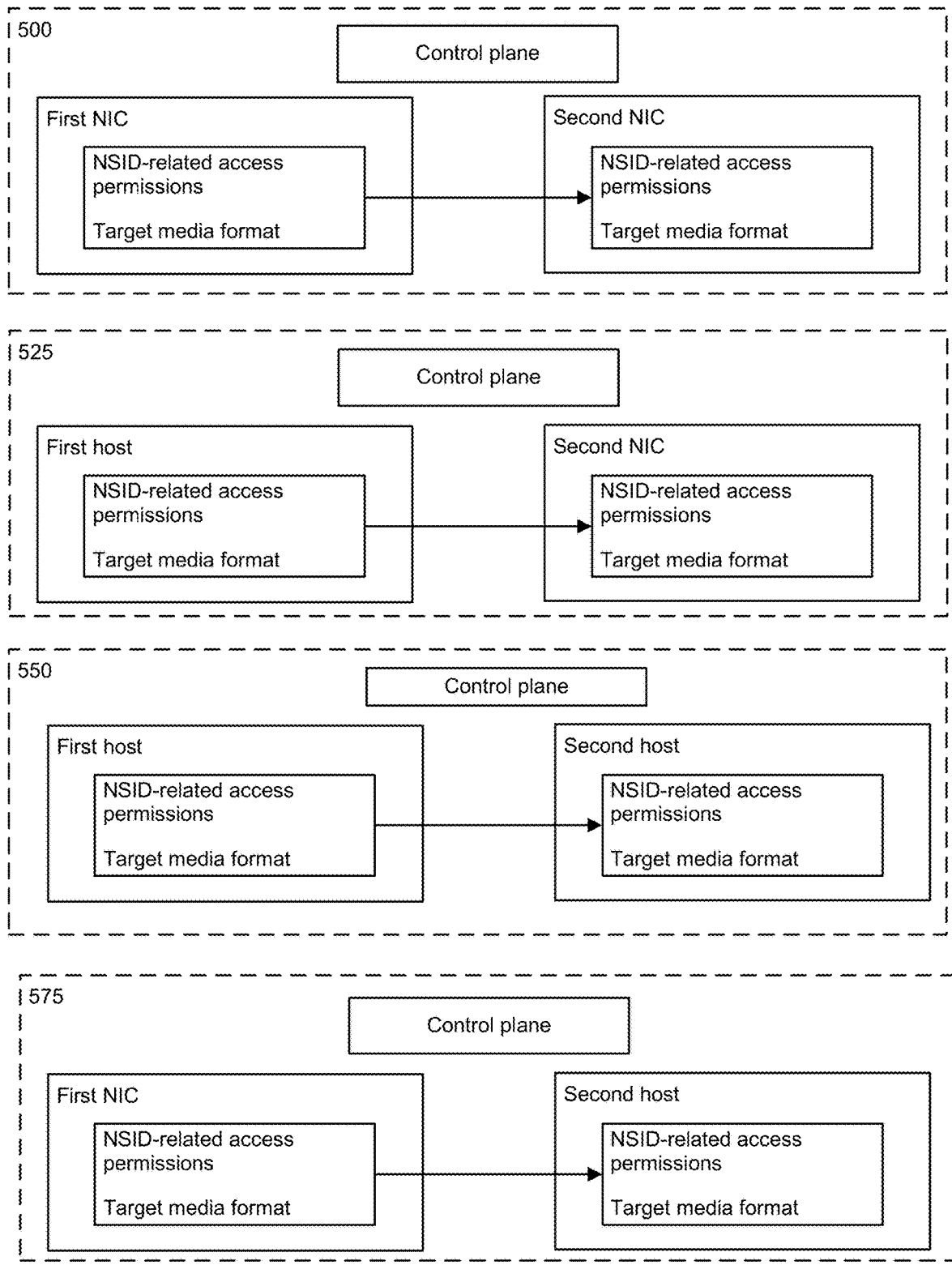
FIG. 5 depicts examples of various source and destination environments associated with migration of a virtualized execution environment.

FIG. 5 depicts examples of various source and destination environments associated with migration of a virtualized execution environment. Migration of a virtualized execution environment can occur in a variety of circumstances. For example, some reasons include: a server malfunctioning, workload load balancing, server maintenance or other reasons. A hypervisor and/or orchestrator can manage the virtualized execution environment migration. Control plane software can manage transfer of parameters used to maintain permission rights and target drive format at the next platform and/or NIC to provide continuity of use of the same NSID for storage transactions. The control plane can execute on any platform connected to the source and destination host and NIC.

At 500, a virtualized execution environment can be migrated from use of a first NIC to use of a second NIC for remote storage transactions. In connection with a change to use the second NIC, NSID-related access permissions (for requesters and target NSID) and target drive format are shared and used by the second NIC for remote storage transactions. The second NIC can utilize a similar per-request and per-target permission scheme as that of the first NIC but the Ftype, PF number or ID (or other parameters) could change while retaining support for use of the same NSID at the second NIC. In other words, the destination platform (e.g., host and/or second NIC) could assign a different Ftype, PF number or ID (or other parameters) but the NSID and format of target drive are preserved for use at the second NIC. In some examples, both the first and second NICs use the conversion format of FIG. 3 to determine access permissions and target drive format for a particular storage transaction.

At 525, a virtualized execution environment can be migrated from use of a first host to use of a second NIC for remote storage transactions. In this example, the first host uses a CPU to generate packets for a remote storage transaction (e.g., NVMe-oF) for virtualized execution environment. After migration, the virtualized execution environment can use the second NIC for packet formation for remote storage transactions instead of its host system. The second NIC can utilize a similar per-request and per-target permission scheme as that of the first host but the Ftype, PF number or ID (or other parameters) could change while retaining support for use of the same NSID at the second NIC. In other words, the destination platform (e.g., second NIC and/or associated host that runs the virtualized execution environment) could assign a different Ftype, PF number or ID (or other parameters) but the NSID and format of target drive are preserved for use at the second NIC.

At 550, a virtualized execution environment can be migrated from use of a first host to use of a second host for remote storage transactions. The second host can be a different platform (e.g., different server, rack, or data center) than that of the first host. In some cases, the second host can be the same platform (e.g., same server, rack, or data center) as that of the first host but a different CPU core or different CPU node. In this example, the first host uses a CPU to generate packets for a remote storage transaction (e.g., NVMe-oF) for virtualized execution environment. After migration, the virtualized execution environment can use a different CPU to generate packets for a remote storage transaction (e.g., NVMe-oF) for virtualized execution environment. The second host can utilize a similar per-request and per-target permission scheme as that of the first host but the Ftype, PF number or ID (or other parameters) could change while retaining support for use of the same NSID at the second NIC. In other words, the destination platform (e.g., second host that runs the virtualized execution environment) could assign a different Ftype, PF number or ID but the NSID (or other parameters) and format of target drive are preserved for use at the second host.

At 575, a virtualized execution environment can be migrated from use of a first NIC to use of a second host for remote storage transactions. The second host can be a different platform (e.g., different server, rack, or data center) than that of the first host. In some cases, the second host can be the same platform (e.g., same server, rack, or data center) as that of the first host but a different CPU core or different CPU node. In this example, the first NIC generates packets for a remote storage transaction (e.g., NVMe-oF) for a virtualized execution environment. After migration, the virtualized execution environment can use a CPU to generate packets for a remote storage transaction (e.g., NVMe-oF) for virtualized execution environment. The second host can utilize a similar per-request and per-target permission scheme as that of the first NIC (and its host) but the Ftype, PF number or ID (or other parameters) could change while retaining support for use of the same NSID at the second host. In other words, the destination platform (e.g., second host that runs the virtualized execution environment) could assign a different Ftype, PF number or ID (or other parameters) but the NSID and format of target drive are preserved for use at the second host.

Figure 6:
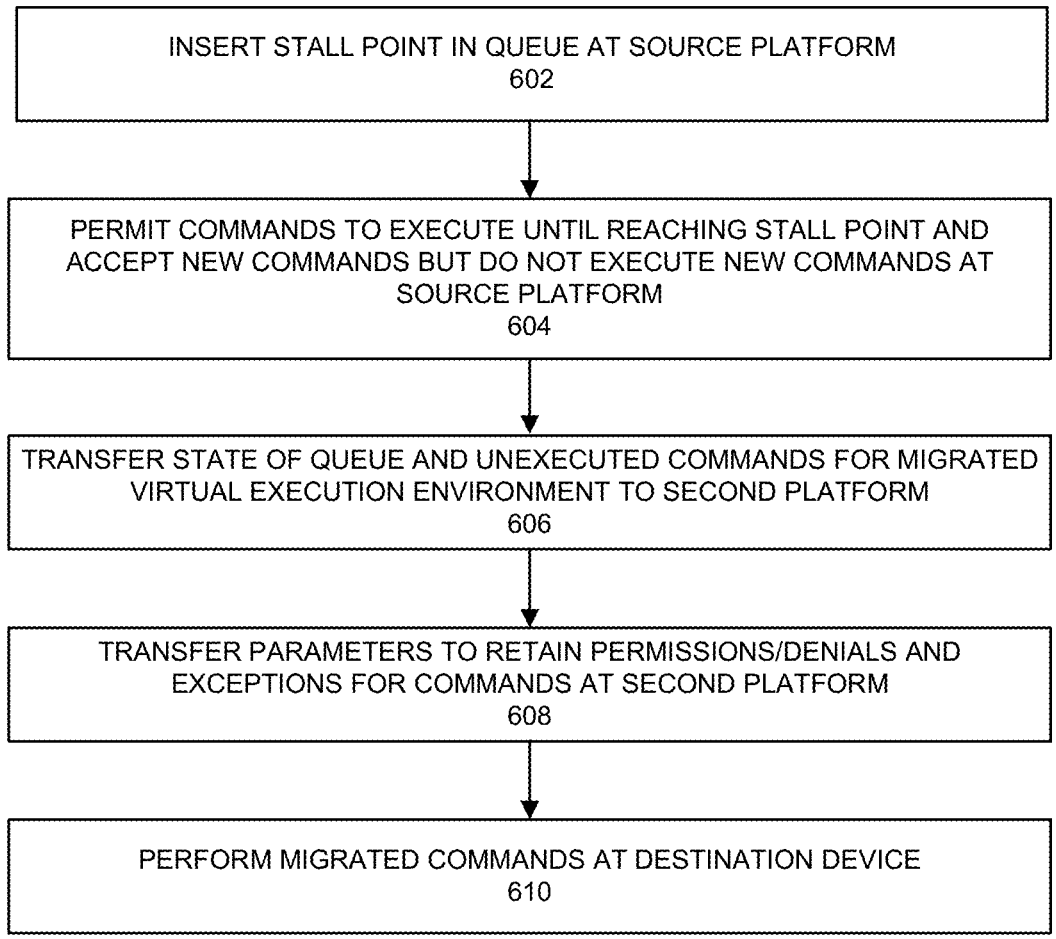
FIG. 6 depicts a process for a migration of a virtualized execution environment.

FIG. 6 depicts a process for a migration of a virtualized execution environment. The process can be performed by any or a combination of a hypervisor, orchestrator, virtual machine manager, driver, or control plane software. At 602, a stall point is set at a command in a queue associated with a virtual execution environment. The stall point can be set at the most recently received command or other command. At 604, commands in the queue are permitted to execute until reaching the stall point command. In other words, the queue is drained until reaching the stall point. New commands can be added to the queue but those commands are not executed until after migration.

At 606, states of the queue are migrated to the destination device. For example, state (e.g., head pointer position, tail pointer position) and unexecuted storage commands can be migrated to the destination NIC for execution. As described earlier, an originating device from which a virtualized execution environment is migrated can use a host and/or NIC to perform generate packets for remote storage transactions whereas the destination device that is to run the migrated virtualized execution environment can use a host and/or NIC to generate packets for remote storage transactions. Accordingly, the queue states and commands from the prior platform are available on the next platform so that the commands can execute on the next platform.

At 608, NSID-related access permissions and target drive format for remote storage transactions are shared with the destination platform. If a look-up scheme involving source permission and target permission is used, as described with respect to FIG. 3, permissions and exclusions (e.g., requester and target), exceptions, and format of target media referenced by the NSID for one or more NSIDs are unchanged despite use of the destination platform and potential changes to an allocated PF identifier, VF identifier, or submission queue identifier at the destination platform.

At 610, migrated commands can be performed at the destination device to continue performance of storage commands.

Accordingly, various embodiments can provide continued use of namespaces for remote storage transactions to allow migration of a virtualized execution environment without interrupting storage transactions to the same namespace.

Figure 7:
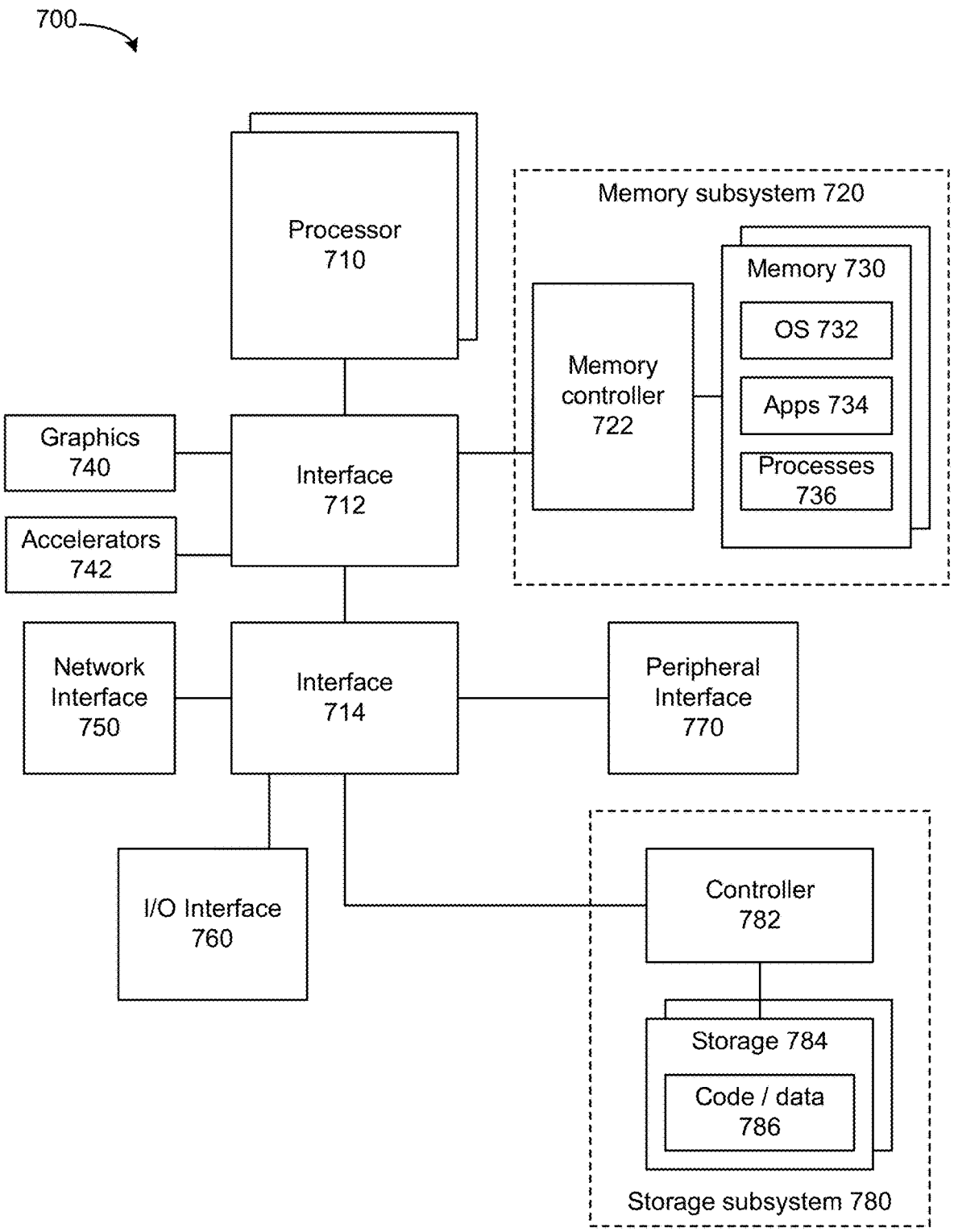
FIG. 7 depicts a system.

FIG. 7 depicts a system. The system can use embodiments described herein to allow migration of a virtual execution environment to another processor or network interface with NVMe-oF offload engine while maintaining at least access rights/denials and sector or block format information and NSIDs assigned to the migrated virtual execution environment. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any one or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720. Various embodiments of network interface 750 use embodiments described herein to receive or transmit timing related signals and provide protection against circuit damage from misconfigured port use while providing acceptable propagation delay.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet, part of the Internet, public cloud, private cloud, or hybrid cloud. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 8:
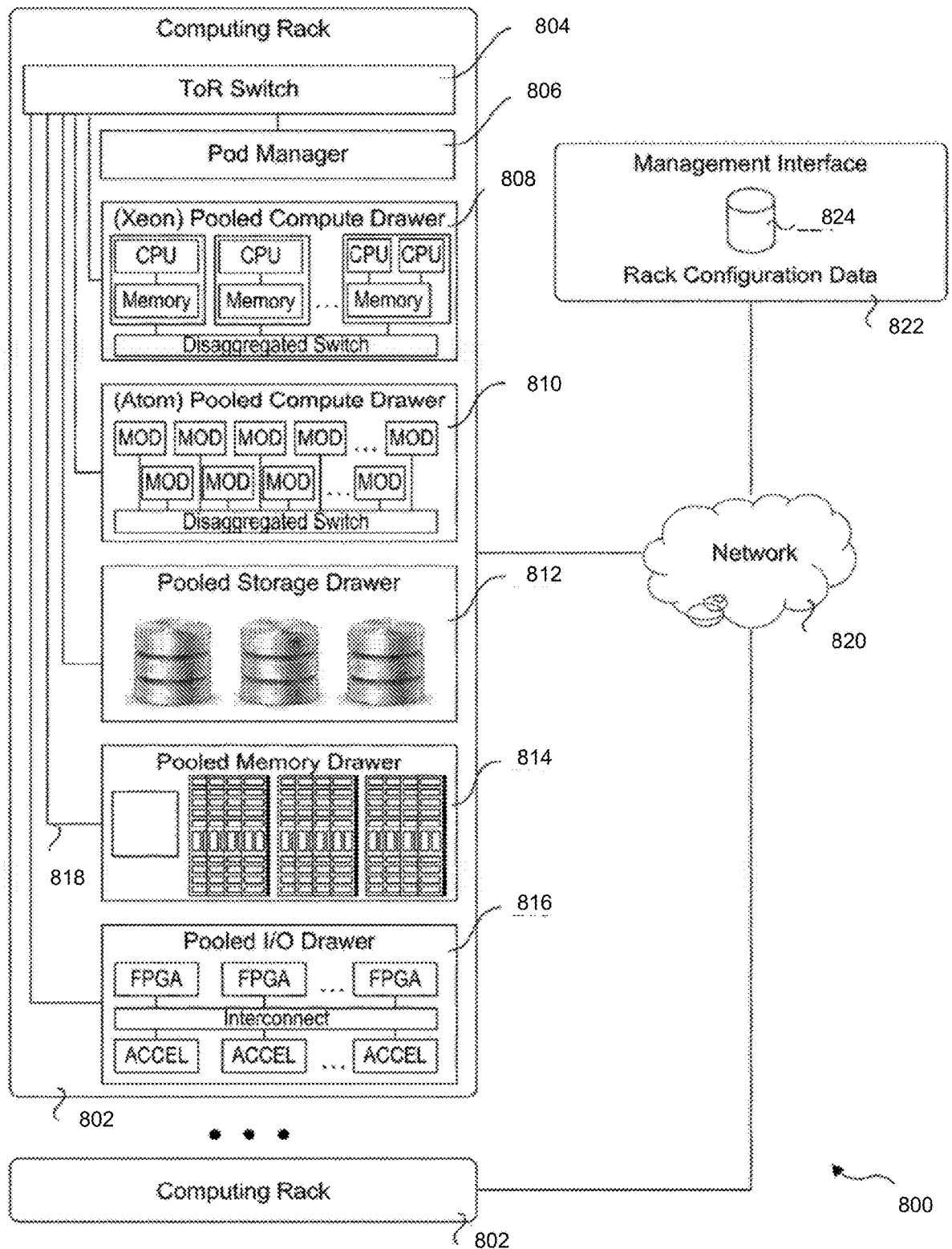
FIG. 8 depicts an environment.

FIG. 8 depicts an environment 800 includes multiple computing racks 802, each including a Top of Rack (ToR) switch 804, a pod manager 806, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® Xeon® processor pooled computer drawer 808, and Intel® ATOM™ processor pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+ Gb/s Silicon Photonics (SiPh) optical link. In one embodiment high-speed link 818 comprises an 800 Gb/s SiPh optical link.

Figure 9:
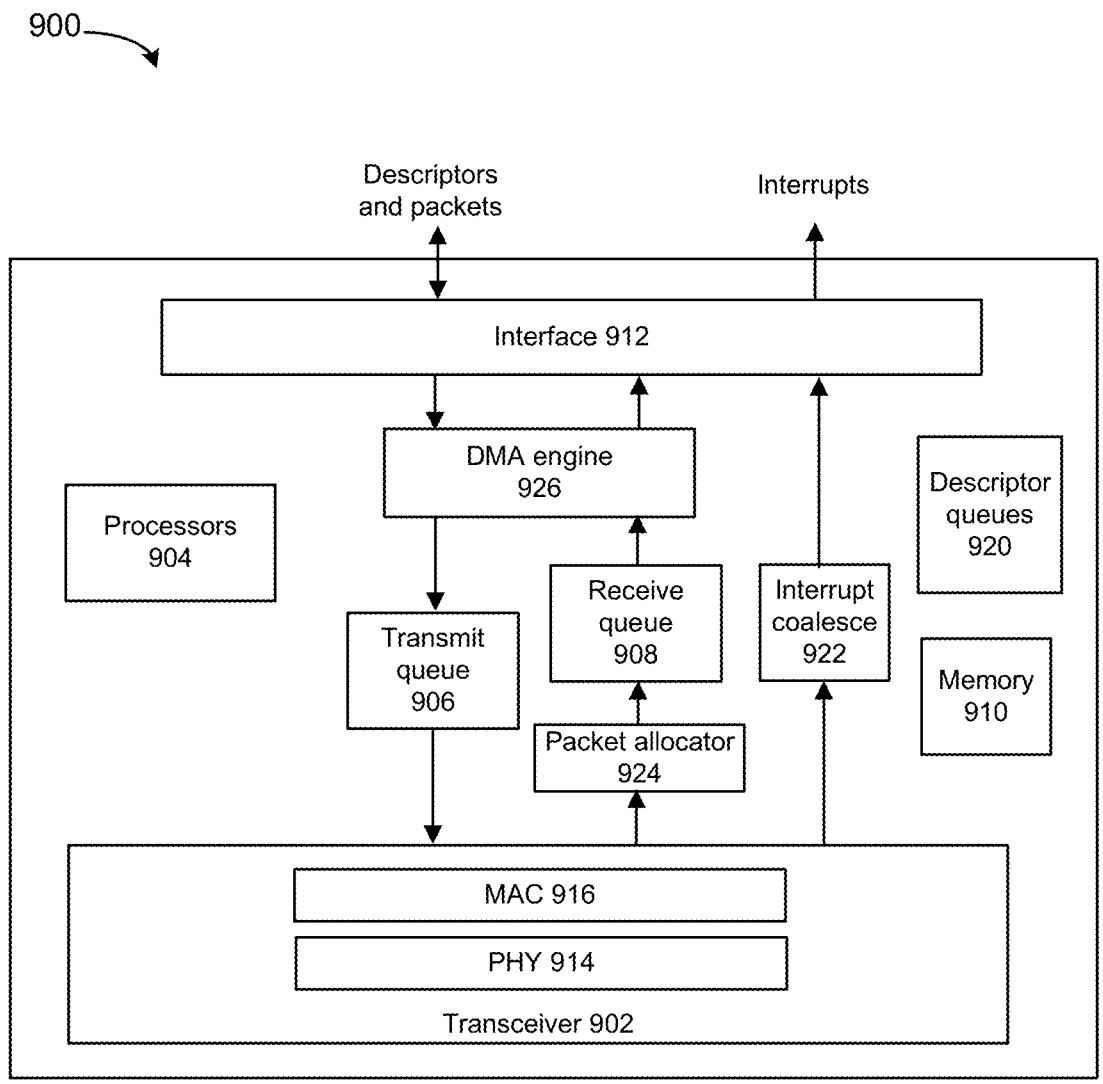
FIG. 9 depicts a network interface.

FIG. 9 depicts a network interface that can use embodiments or be used by embodiments. Various processors of network interface 900 can use techniques described herein to support determination of permissions and target sector or block format despite virtualized execution environment migration and provide packet formation and transmission of packets for remote storage transactions including NVMe-oF. For example, if a first core of processors 904 performs packet processing and a second core of processor 904 performs a power management process, the second core can modify operating parameters of the first core in accordance with embodiments described herein.

Network interface 900 can include transceiver 902, processors 904, transmit queue 906, receive queue 908, memory 910, and bus interface 912, and DMA engine 926. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include physical layer (PHY) circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to assemble data to be transmitted into packets, that include destination and source addresses along with network control information and error detection hash values. MAC circuitry 916 can be configured to process MAC headers of received packets by verifying data integrity, removing preambles and padding, and providing packet content for processing by higher layers.

Processors 904 can be any combination of a: CPU, core, graphics processing unit (GPU), field programmable gate array (FPGA), application specific integrated circuit (ASIC), or programmable hardware device, or fixed function hardware device that allow programming of network interface 900. For example, processors 904 can provide for allocation or deallocation of intermediate queues. For example, a "smart network interface" can provide packet processing capabilities in the network interface using processors 904.

Packet allocator 924 can provide distribution of received packets for processing by multiple CPUs or cores using timeslot allocation described herein or RSS. When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 926 can copy a packet header, packet payload, and/or descriptor directly from host memory to the network interface or vice versa, instead of copying the packet to an intermediate buffer at the host and then using another copy operation from the intermediate buffer to the destination buffer.

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes an apparatus comprising: an interface comprising circuitry and logic, the interface to: generate packets for storage transactions using a transport protocol and in connection with commencement of a virtual execution environment on a second computing platform, provide capability of a first computing platform at the second computing platform for the virtual execution environment to continue storage transactions and maintain use of same name space identifiers (NSIDs).

Example 2 includes any example, wherein the interface is to perform one or more of: migrate parameters associated with storage transaction permissions to the second computing platform or migrate format of a target media drive.

Example 3 includes any example, wherein permission comprise one or more of: per-requester permission or per-target media permission.

Example 4 includes any example, wherein per-requester permission comprises one or more of: read enable, write enable, read and write enabled and per-target media permission comprises one or more of: read enable, write enable, read and write enabled.

Example 5 includes any example, wherein a format of the target media drive comprises one or more of: sector or block format, read or write enablement, or end-to-end protection.

Example 6 includes any example, wherein the interface is to: prior to migration of the virtual execution environment to the second computing platform: execute at least one received storage commands and identify unexecuted commands for migration to the second computing platform.

Example 7 includes any example, wherein the commencement is initiated based on one on one or more of: virtual execution environment migration, server maintenance, or load balancing.

Example 8 includes any example, wherein the virtual execution environment is to request a storage transaction that is translated to a transaction over a transport protocol.

Example 9 includes any example, wherein to translate the storage transaction to a transaction over a transport protocol, the virtual execution environment is to execute a driver that supports storage transactions using Non-Volatile Memory Express (NVMe).

Example 10 includes any example, and including one of more of: a server, data center, or rack.

Example 11 includes an apparatus comprising: a computing system comprising at least one processor and at least one memory device and an interface to: determine access rights in response to requested access by a requester to a namespace identifier associated with a target media, wherein the access rights for the requester and namespace identifier are independent of an identifier of the requester.

Example 12 includes any example, wherein after migration of the requester to another computing system or network interface, one or more of the computing system or network interface are to apply same access rights for the requester as were applied before the migration based on received parameters and independent of an identifier of the requester after migration.

Example 13 includes any example, wherein the access rights comprise one or more of: read and write enabled, read enabled, or write enabled.

Example 14 includes any example, wherein the access rights comprise one or more of: access rights based on a requester of a storage transaction or access rights based on a target storage device.

Example 15 includes any example, wherein the interface is to provide a target media format for the requester and namespace identifier independent of the identifier of the requester and the target media format comprises one or more of: sector or block format, read or write enablement, or end-to-end protection.

Example 16 includes any example, wherein the interface is to receive unexecuted storage commands associated with the requester generated on a prior platform and the interface is to store the unexecuted storage commands for execution.

Example 17 includes a computer-implemented method comprising: migrating a virtualized execution environment from a first platform to a second platform while retaining use of a namespace identifier and permitting issuance of storage transactions by the virtualized execution environment by use of the namespace identifier.

Example 18 includes any example, and includes retaining access permissions and target media format independent of one or more identifiers associated with the migrated virtualized execution environment at the second platform.

Example 19 includes any example, wherein permitting issuance of storage transactions by the virtualized execution environment comprises: performing a storage transaction in a queue associated with the virtualized execution environment and migrating an unperformed storage transaction to a queue in the second platform.

Example 20 includes any example, and includes executing the unperformed storage transaction using the second platform.

What is claimed is:

1. An apparatus comprising:
an interface comprising circuitry and logic, the interface to:
generate packets for storage transactions using a transport protocol; and
in connection with commencement of a virtual execution environment on a second computing platform, provide capability of a first computing platform at the second computing platform for the virtual execution environment to continue storage transactions and maintain use of same name space identifiers (NSIDs), wherein the first and second computing platforms are physical and distinct platforms, and wherein the virtual execution environment comprises a virtual machine implemented on the first and second computing platforms.

2. The apparatus of claim 1, wherein the interface is to perform one or more of:
migrate parameters associated with storage transaction permissions to the second computing platform or migrate format of a target media drive.

3. The apparatus of claim 2, wherein permission comprise one or more of: per-requester permission or per-target media permission.

4. The apparatus of claim 3, wherein per-requester permission comprises one or more of: read enable, write enable, read and write enabled and per-target media permission comprises one or more of: read enable, write enable, read and write enabled.

5. The apparatus of claim 2, wherein a format of the target media drive comprises one or more of: sector or block format, read or write enablement, or end-to-end protection.

6. The apparatus of claim 2, wherein the interface is to:
prior to migration of the virtual execution environment to the second computing platform:
execute at least one received storage commands; and
identify unexecuted commands for migration to the second computing platform.

7. The apparatus of claim 1, wherein the commencement is initiated based on one on one or more of:
virtual execution environment migration, server maintenance, or load balancing.

8. The apparatus of claim 1, wherein the virtual execution environment is to request a storage transaction that is translated to a transaction over a transport protocol.

9. The apparatus of claim 8, wherein to translate the storage transaction to a transaction over a transport protocol, the virtual execution environment is to execute a driver that supports storage transactions using Non-Volatile Memory Express (NVMe).

10. The apparatus of claim 1, comprising: one of more of: a server, data center, or rack.

11. An apparatus comprising:
a computing system comprising at least one processor and at least one memory device and an interface to:
determine access rights in response to requested access by a requester to a namespace identifier associated with a target media, wherein the access rights for the requester and namespace identifier are independent of an identifier of the requester,
wherein the namespace identifier is allocated to a virtual execution environment.

12. The apparatus of claim 11, wherein after migration of the requester to another computing system or network interface, one or more of the computing system or network interface are to apply same access rights for the requester as were applied before the migration based on received parameters and independent of an identifier of the requester after migration.

13. The apparatus of claim 11, wherein the access rights comprise one or more of:
read and write enabled, read enabled, or write enabled.

14. The apparatus of claim 11, wherein the access rights comprise one or more of:
access rights based on a requester of a storage transaction or access rights based on a target storage device.

15. The apparatus of claim 11, wherein the interface is to provide a target media format for the requester and namespace identifier independent of the identifier of the requester and the target media format comprises one or more of: sector or block format, read or write enablement, or end-to-end protection.

16. The apparatus of claim 11, wherein the interface is to receive unexecuted storage commands associated with the requester generated on a prior platform and the interface is to store the unexecuted storage commands for execution.

17. A computer-implemented method comprising:
migrating a virtualized execution environment from a first platform to a second platform while retaining use of a namespace identifier and permitting issuance of storage transactions by the virtualized execution environment by use of the namespace identifier, wherein the first and second computing platforms are physical and distinct platforms, and wherein the virtual execution environment comprises a virtual machine implemented on the first and second computing platforms.

18. The computer-implemented method of claim 17, comprising:
retaining access permissions and target media format independent of one or more identifiers associated with the migrated virtualized execution environment at the second platform.

19. The computer-implemented method of claim 17, wherein permitting issuance of storage transactions by the virtualized execution environment comprises:
performing a storage transaction in a queue associated with the virtualized execution environment and migrating an unperformed storage transaction to a queue in the second platform.

20. The computer-implemented method of claim 19, comprising:
executing the unperformed storage transaction using the second platform.

\* \* \* \* \*